US011541617B2

(12) United States Patent
Orii

(10) Patent No.: US 11,541,617 B2
(45) Date of Patent: Jan. 3, 2023

(54) PNEUMATIC TIRE, TIRE VULCANIZATION MOLD, AND METHOD OF MANUFACTURING PNEUMATIC TIRE

(71) Applicant: TOYO TIRE CORPORATION, Itami (JP)

(72) Inventor: Keiki Orii, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 430 days.

(21) Appl. No.: 16/695,722

(22) Filed: Nov. 26, 2019

(65) Prior Publication Data
US 2020/0164606 A1 May 28, 2020

(30) Foreign Application Priority Data
Nov. 28, 2018 (JP) .............................. JP2018-222706

(51) Int. Cl.
*B60C 11/13* (2006.01)
*B29D 30/06* (2006.01)
(Continued)

(52) U.S. Cl.
CPC .......... *B29D 30/0606* (2013.01); *B60C 11/04* (2013.01); *B60C 11/11* (2013.01); *B60C 11/13* (2013.01); *B60C 11/1353* (2013.01); *B29D 2030/0612* (2013.01); *B29D 2030/0617* (2013.01); *B60C 2011/1361* (2013.01)

(58) Field of Classification Search
CPC ........ B60C 11/1353; B60C 2011/1361; B29D 2030/0617; B29D 2030/0612
See application file for complete search history.

(56) References Cited

U.S. PATENT DOCUMENTS

2010/0084063 A1 4/2010 Koutoku
2015/0360519 A1* 12/2015 Kuwano ............. B60C 11/1353
152/209.19
(Continued)

FOREIGN PATENT DOCUMENTS

DE 102015210042 A1 12/2016
JP 2004136617 A * 5/2004
(Continued)

OTHER PUBLICATIONS

Translation of JP-2004136617-A (Year: 2004).*
(Continued)

*Primary Examiner* — Xiao S Zhao
*Assistant Examiner* — John J DeRusso
(74) *Attorney, Agent, or Firm* — WHDA, LLP

(57) ABSTRACT

A pneumatic tire includes: a lateral groove that includes a groove bottom surface extending in a direction crossing a tire circumferential direction; and a protrusion provided on the groove bottom surface and extending in an extension direction of the groove bottom surface. The protrusion includes: a main body; and a raised portion provided at least at one end portion on one side in a longitudinal direction of the main body, and shaped such that a height of the raised portion from the groove bottom surface increases from an outside to an inside in the longitudinal direction of the main body. The raised portion has at least one vent mark that is a mark of a vent of a tire vulcanization mold.

6 Claims, 9 Drawing Sheets

(51) Int. Cl.
    *B60C 11/11*    (2006.01)
    *B60C 11/04*    (2006.01)

(56) References Cited

U.S. PATENT DOCUMENTS

| | | |
|---|---|---|
| 2017/0021676 A1 | 1/2017 | Ichiryu |
| 2017/0173905 A1 | 6/2017 | Ando |

FOREIGN PATENT DOCUMENTS

| | | |
|---|---|---|
| JP | 2006-015627 A | 1/2006 |
| JP | 2008-222162 A | 9/2008 |
| JP | 2012-35684 A | 2/2012 |
| JP | 2017-113895 A | 6/2017 |
| WO | 2015/093325 A1 | 6/2015 |

OTHER PUBLICATIONS

Office Action dated Aug. 2, 2021, issued in counterpart CN Application No. 201911151743.8, with English Translation. (13 pages).
Office Action dated Jun. 21, 2022, issued in counterpart JP application No. 2018-222706, with the English machine translation. (6 pages).

\* cited by examiner

PNEUMATIC TIRE, TIRE VULCANIZATION MOLD, AND METHOD OF MANUFACTURING PNEUMATIC TIRE

CROSS-REFERENCE TO RELATED APPLICATIONS

This application claims priority of Japanese Patent Application No.: 2018-222706 filed on Nov. 28, 2018, the content of which is incorporated herein by reference.

BACKGROUND OF THE INVENTION

Technical Field

The present invention relates to a pneumatic tire, a tire vulcanization mold, and a method of manufacturing a pneumatic tire.

Related Art

A pneumatic tire which includes protrusions (e.g., stone ejectors) on groove bottoms of grooves formed in a tread portion is known. JP 2012-35684 discloses a pneumatic tire which includes a plurality of grooves disposed in a tread portion. The plurality of grooves extend in a tire circumferential direction and a tire width direction. Protrusions are provided on groove bottoms of the plurality of grooves. Heights of the protrusions vary in a longitudinal direction of the grooves.

SUMMARY

During vulcanization molding of the pneumatic tire having the protrusions described above, a defective flow of rubber may occur in recesses provided in a mold for molding the protrusions. In this case, dents (bareness) may be produced in a surface of the protrusions of the pneumatic tire after vulcanization molding.

An object of the present invention is to provide a pneumatic tire, a tire vulcanization mold, and a method of manufacturing a pneumatic capable of reducing bareness.

One aspect of the present invention provides a pneumatic tire including: a lateral groove that includes a groove bottom surface extending in a direction crossing a tire circumferential direction; and a protrusion provided on the groove bottom surface and extending in an extension direction of the groove bottom surface. The protrusion includes a main body, and a raised portion provided at least at one end portion on one side in a longitudinal direction of the main body, and shaped such that a height of the raised portion from the groove bottom surface increases from an outside to an inside in the longitudinal direction of the main body. The raised portion has at least one vent mark that is a mark of a vent of a tire vulcanization mold.

According to this configuration, the raised portion of the protrusion is shaped such that the height of the raised portion from the groove bottom surface increases from the outside to the inside in the longitudinal direction of the main body. Accordingly, the recess of the tire vulcanization mold corresponding to the protrusion becomes deeper from the outside to the inside in the longitudinal direction of the recess in the portion corresponding to the raised portion of the protrusion. In this case, rubber is guided along the portion of the recess corresponding to the raised portion of the protrusion during vulcanization molding. Accordingly, the rubber easily flows to a deepest portion of the recess while reducing a defective flow of rubber. Reduction of bareness is thus achievable.

Further, the vent mark is formed on the raised portion of the protrusion as a mark of the vent on the tire vulcanization mold. Accordingly, air is discharged to the outside of the tire vulcanization mold through the vent in the portion of the recess corresponding to the raised portion of the protrusion during vulcanization molding. In this manner, bareness in the raised portion of the protrusion can be effectively reduced.

The vent may be a vent plug. The vent mark may be a vent spew.

The vent may be a spring vent. The vent mark may be a spring vent mark.

According to this configuration, the spring vent mark is formed as the vent mark on the raised portion of the pneumatic tire. The spring vent mark is less noticeable than a vent spew. In this case, the vent mark becomes less noticeable than in a case where the vent mark is a vent spew. Accordingly, deterioration of external appearance quality of the pneumatic tire is avoidable.

The raised portion may include at least one step portion to have a stepped shape in a side view. An upper surface of the step portion may be larger than the vent mark.

According to this configuration, the raised portion has a stepped shape in the side view. The step portion of the raised portion is larger than the vent mark. Accordingly, the vent mark fits inside the upper surface of the step portion. Deterioration of external appearance quality of the pneumatic tire is therefore avoidable even when the vent mark is formed on the upper surface of the step portion.

The raised portion may include a plurality of the step portions.

According to this configuration, the height of the raised portion from the groove bottom surface increases stepwise from the outside to the inside in the longitudinal direction of the main body. Accordingly, the portion of the recess of the tire vulcanization mold corresponding to the raised portion becomes deeper stepwise from the outside to the inside in the longitudinal direction of the recess. In this case, rubber easily flows to a deepest part of the recess along the portion of the recess of the tire vulcanization mold corresponding to the raised portion during vulcanization molding. Accordingly, bareness in the raised portion of the protrusion can be reduced.

The raised portion may have a plurality of the vent marks.

According to this configuration, the raised portion has the plurality of vent marks. In this case, a plurality of vents are formed in the portion of the recess of the tire vulcanization mold corresponding to the raised portion. In this case, air can be discharged from remaining one of the plurality of vents when one of the plurality of vents is clogged with rubber. Accordingly, reduction of bareness is achievable even in this state.

Each of the plurality of step portions may have the vent mark.

Another aspect of the present invention provides a tire vulcanization mold includes: a groove forming portion used for vulcanizing a groove; and a protrusion forming portion that extends along the groove forming portion, and is recessed in a groove bottom forming surface of the groove forming portion to form a protrusion on a groove bottom of the groove. The protrusion forming portion includes a lowered portion provided at least on one side in a longitudinal direction of the protrusion forming portion, and shaped such that a depth of the groove forming portion decreases from an inside to an outside in the longitudinal direction. A vent is formed in the lowered portion.

According to this configuration, the protrusion forming portion becomes deeper in the lowered portion from the outside to the inside in the longitudinal direction of the protrusion forming portion. In this case, rubber is guided along the lowered portion during vulcanization molding. Accordingly, the rubber easily flows to a deepest portion of the protrusion forming portion while reducing a defective flow of rubber. Reduction of bareness is thus achievable.

Further, the vent is formed in the lowered portion. In this case, air is discharged to the outside of the tire vulcanization mold through the vent in the lowered portion. Accordingly, bareness can be effectively reduced.

A further aspect of the present invention provides a pneumatic tire manufacturing method for manufacturing a pneumatic tire by vulcanizing a green tire using the tire vulcanization mold described above.

According to this tire manufacturing method, a pneumatic tire capable of reducing bareness, and thereby reducing deterioration of appearance quality can be manufactured.

The pneumatic tire, the tire vulcanization mold, and the method of manufacturing the pneumatic according to the present invention achieve reduction of bareness.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

An embodiment according to the present invention is hereinafter described with reference to the accompanying drawings. It should be noted that the following description is essentially presented by way of example, and not intended to limit the present invention, applicable ranges of the present invention, or purposes of use of the present invention. In addition, the accompanying drawings are only schematic figures, and do not show actual ratios or the like of respective dimensions. In the figures, a tire circumferential direction is expressed as TC, a tire width direction is expressed as TW, and a tire radial direction is expressed as TR depending on circumstances.

First Embodiment

Figure 1:
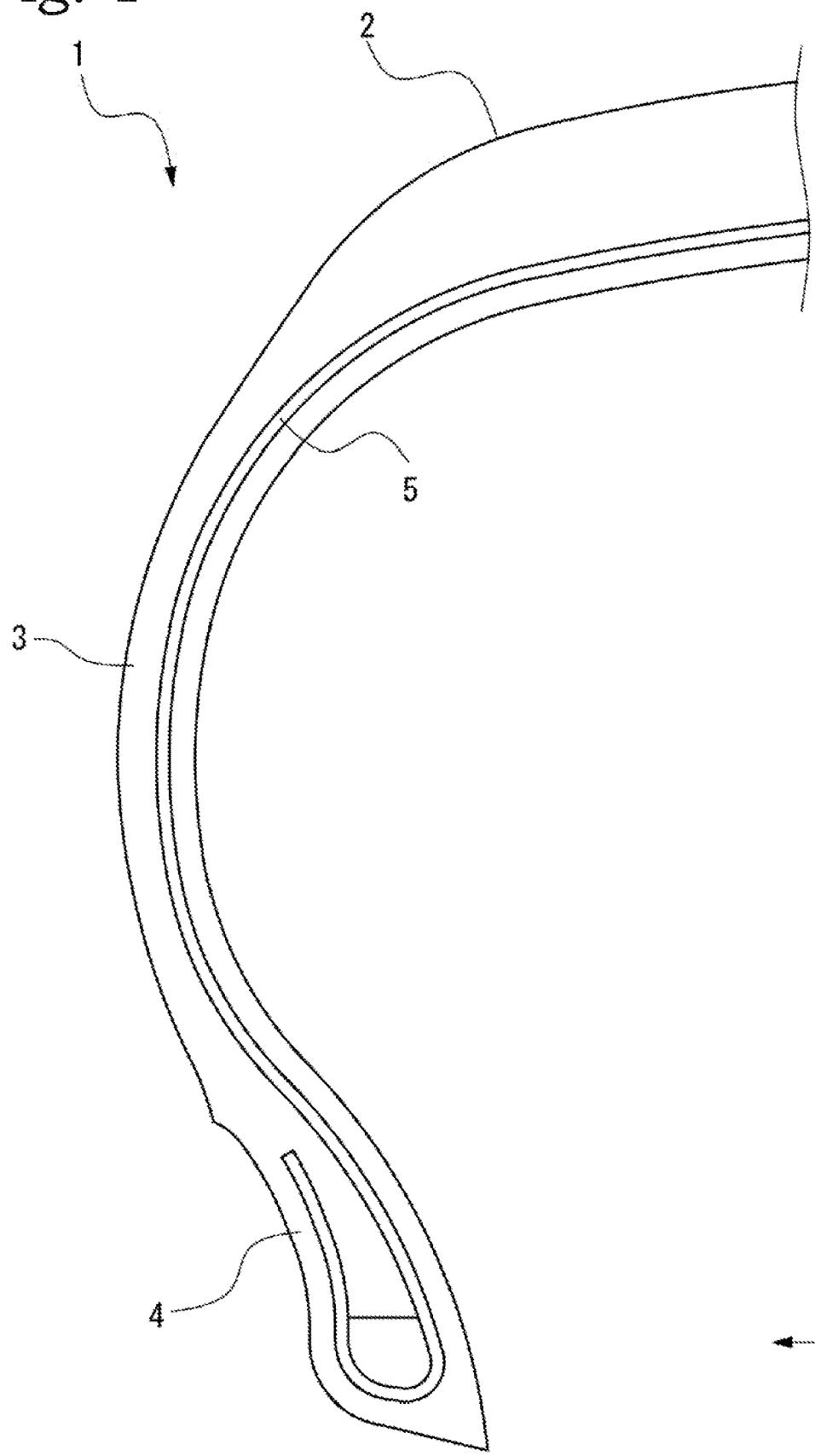
FIG. 1 is a cross-sectional view of a pneumatic tire in a meridian direction according to a first embodiment of the present invention.

FIG. 1 is a cross-sectional view of a pneumatic tire in a meridian direction according to the present embodiment.

Referring to FIG. 1, a pneumatic tire 1 includes a tread portion 2, a sidewall portion 3, and a pair of bead portions 4. The sidewall portions 3 extend from both end portions of the tread portions 2 in the tire width direction TW while curving toward the inside in the tire radial direction TR. Each of the bead portions 4 is provided at an inner end of the corresponding sidewall portion 3 in the tire radial direction TR. A carcass layer 5 having a toroidal shape is extended between the pair of bead portions 4 inside the pneumatic tire 1. The accompanying drawing does not depict internal structures except for the carcass layer 5.

Figure 2:
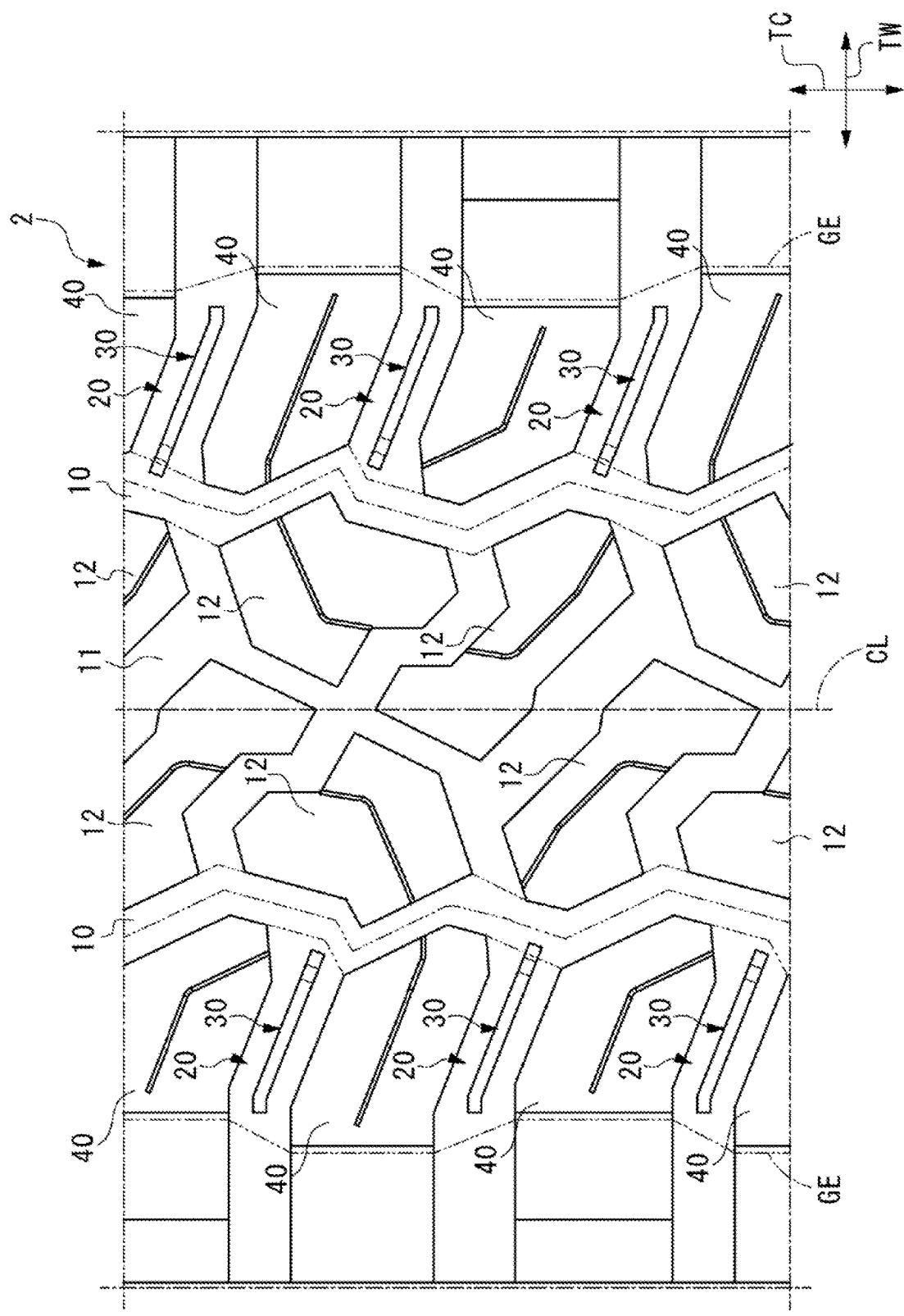
FIG. 2 is a development view showing a tread pattern of a tread portion of the pneumatic tire according to the first embodiment.

FIG. 2 is a development view showing a tread pattern of the tread portion 2 of the pneumatic tire 1 according to the present embodiment. FIG. 2 shows only a part of the tread pattern of the pneumatic tire 1 in the tire circumferential direction TC.

Referring to FIG. 2, the tread portion 2 of the pneumatic tire 1 of the present embodiment includes two longitudinal grooves 10 extending in the tire circumferential direction TC. In the present embodiment, the longitudinal grooves 10 are respectively provided on both sides in the tire width direction TW with respect to a center line CL in the tire width direction TW. The longitudinal grooves 10 of the present embodiment extend in a zigzag line in the tire circumferential direction TC. The longitudinal groove 10 may linearly extend in the tire circumferential direction TC.

A tread groove 11 is provided in a region between the two longitudinal grooves 10 of the tread portion 2. The tread groove 11 is constituted by a plurality of grooves each extending in a direction crossing both the tire circumferential direction TC and the tire width direction TW. In other words, the tread groove 11 is provided in a mesh shape. A plurality of blocks 12 are defined by the tread groove 11 and the longitudinal grooves 10 in this region.

Lateral grooves 20 are provided in the tread portion 2 in a region outside the longitudinal grooves 10 in the tire width direction TW. The lateral grooves 20 extend in such directions as to cross the longitudinal grooves 10. In other words, the lateral grooves 20 extend in such directions as to cross the tire circumferential direction TC. The lateral grooves 20 are connected to the longitudinal grooves 10 in such a manner as to communicate with the longitudinal grooves 10. The lateral grooves 20 extend across ground contact ends GE of the pneumatic tire 1 in the tire width direction TW. The lateral grooves 20 may extend in such directions as to cross the tire circumferential direction TC at right angles.

Each of the lateral grooves 20 includes a stone ejector 30 extending in the extension direction of the lateral groove 20. The stone ejector 30 is a protrusion provided on a groove bottom surface of a tire such as an off-road tire to prevent damage to the groove bottom surface caused by a caught stone, and to easily discharge a caught stone to the outside of the groove. The stone ejector 30 is an example of a protrusion according to the present invention.

A plurality of shoulder blocks 40 are defined by the longitudinal grooves 10 and the lateral grooves 20 in a region outside the longitudinal grooves 10 in the tire width direction TW in the tread portion 2 of the pneumatic tire 1.

Figure 3:
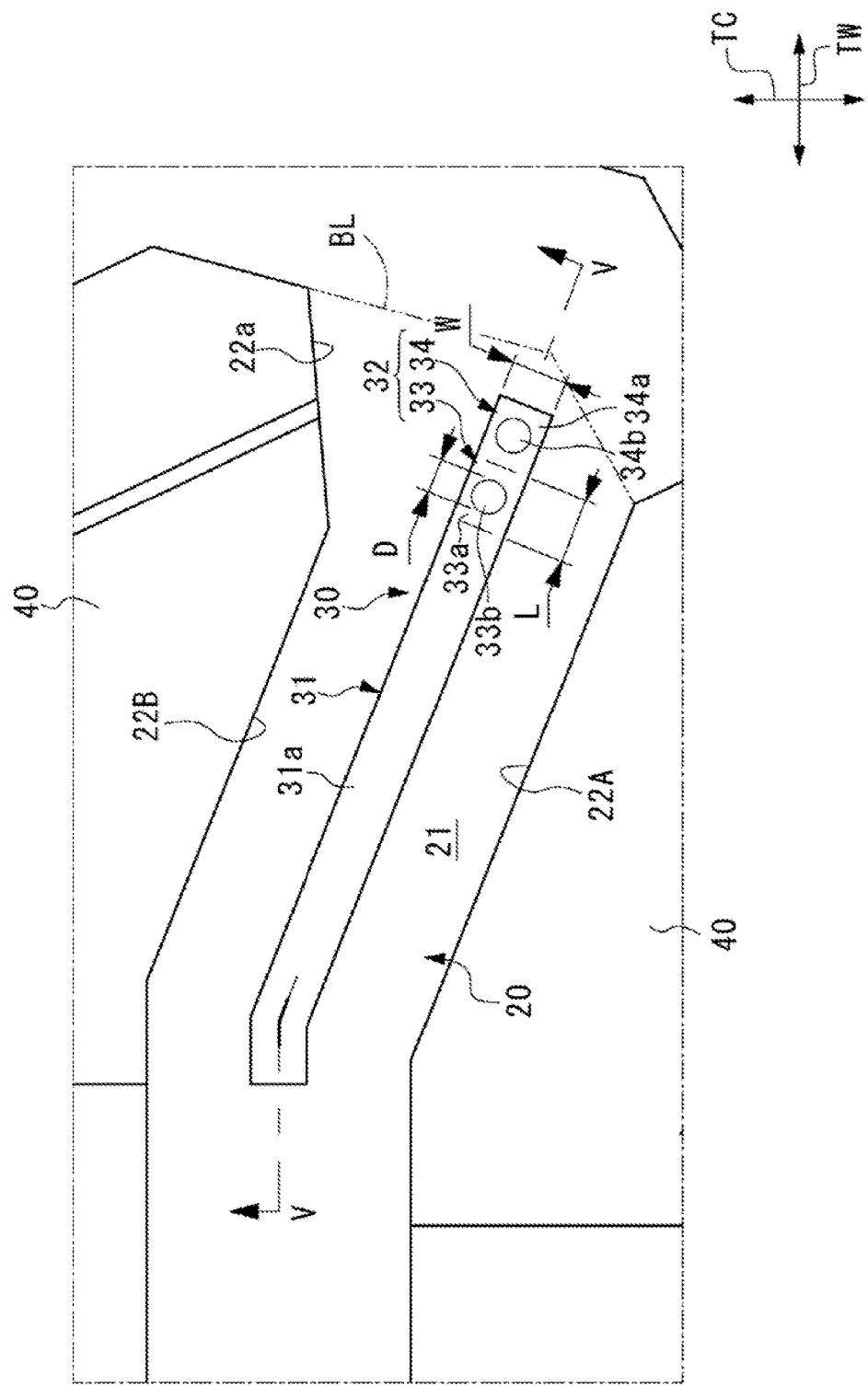
FIG. 3 is a plan view of the tread portion of a pneumatic tire, showing a stone ejector and surroundings according to the first embodiment.
Figure 4:
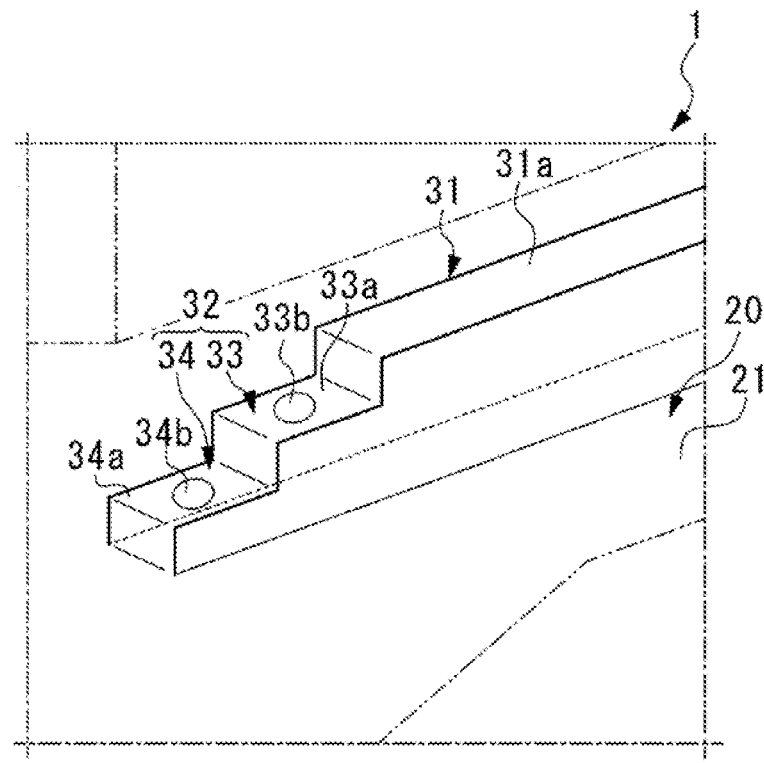
FIG. 4 is a perspective view showing a raised portion of the stone ejector and surroundings according to the first embodiment.
Figure 5:
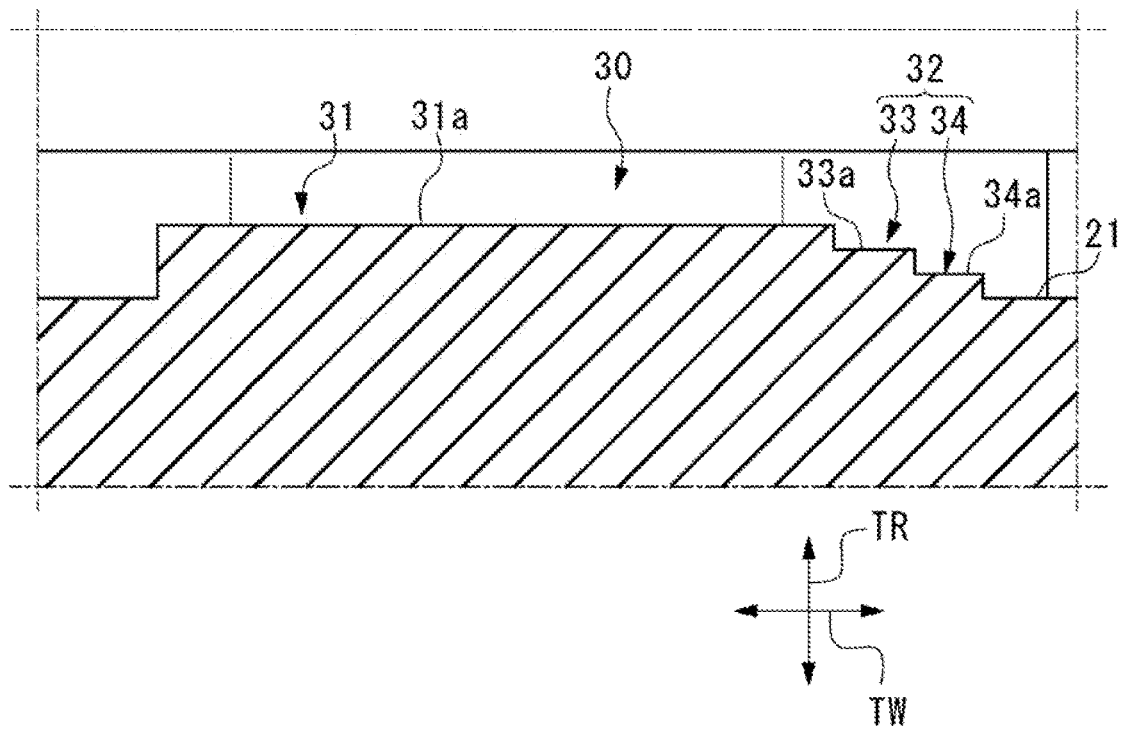
FIG. 5 is a cross-sectional view taken along line V-V in FIG. 3.

FIG. 3 is a plan view of the tread portion 2 of the pneumatic tire 1, showing the stone ejector 30 and surroundings. FIG. 4 is a perspective view showing a raised portion 32 (described below) of the stone ejector 30 and surroundings. FIG. 5 is a cross-sectional view taken along line V-V in FIG. 3.

Referring to FIG. 3, the lateral groove 20 includes a groove bottom surface 21 extending in such a direction as to cross the tire circumferential direction TC, and a pair of groove side walls 22A and 22B rising outward in the tire radial direction from both ends of the groove bottom surface 21 in a width direction of the lateral groove. In other words, the pair of groove side walls 22A and 22B of the lateral groove 20 are each constituted by a side surface of the shoulder block 40. As described above, the stone ejector 30 is provided on the groove bottom surface 21 of the lateral groove 20.

The lateral groove 20 extends while widening from the outside to the inside in the tire width direction TW. In other words, the lateral groove 20 extends while widening on the longitudinal groove 10 side in the longitudinal direction of the lateral groove 20. The groove side wall 22A on one side in the width direction of the lateral groove 20 (lower side in FIG. 3) extends substantially linearly in the region where the stone ejector 30 is disposed. On the other hand, the groove side wall 22B on the other side in the width direction of the lateral groove 20 (upper side in FIG. 3) includes an inclined portion 22a extending away from the opposing groove side wall 22A from the outside to the inside in the tire width direction TW in the region where the stone ejector 30 is disposed (left side to right side in FIG. 3).

The stone ejector 30 includes a main body 31, and a raised portion 32 provided at one end portion on one side in the longitudinal direction of the main body 31. Specifically, the raised portion 32 is provided at an end portion on the longitudinal groove 10 side in the longitudinal direction of the main body 31.

The main body 31 and the raised portion 32 of the stone ejector 30 are disposed inside the lateral groove 20 at positions separated from the pair of groove side walls 22A and 22B of the lateral groove 20. In addition, the stone ejector 30 of the present embodiment is disposed such that the main body 31 does not reach the longitudinal groove 10. The state that the main body 31 does not reach the longitudinal groove 10 herein refers to such a state that the main body 31 does not extend across a virtual boundary line BL between the longitudinal groove 10 and the lateral groove 20. The virtual boundary line BL is a line offset from a groove center of the longitudinal groove 10 by a half of the groove width of the longitudinal groove 10.

Referring to both FIGS. 3 and 4, the main body 31 of the stone ejector 30 has a substantially rectangular parallelepiped shape extending in the extension direction of the lateral groove 20. The main body 31 of the stone ejector 30 has a top surface 31a having a substantially rectangular shape.

Further referring to both FIGS. 4 and 5, the raised portion 32 of the stone ejector 30 is formed such that a height of the raised portion 32 from the groove bottom surface 21 increases from the outside to the inside in the longitudinal direction of the main body 31. In the present embodiment, the raised portion 32 has a stepped shape in a side view. Specifically, the raised portion 32 includes a first step portion 33 lower than the main body 31 by one step, and a second step portion 34 lower than the first step portion 33 by one step. More specifically, the first step portion 33 includes a first upper surface 33a disposed such that a height of the first upper surface 33a from the groove bottom surface 21 (hereinafter simply referred to as height) becomes smaller than a height of a top surface 31a of the main body 31. Similarly, the second step portion 34 includes a second upper surface 34a disposed such that a height of the second upper surface 34a becomes smaller than the height of the first upper surface 33a of the first step portion 33.

As shown in FIG. 4, a spring vent mark 33b is formed on the first upper surface 33a of the first step portion 33. The spring vent mark 33b is a mark of a spring vent 60 (shown in FIG. 7) of the tire vulcanization mold 50. The spring vent mark 33b has a shape of circular stripes. Moreover, a spring vent mark 34b similar to the spring vent mark 33b of the first step portion 33 is also formed on the second upper surface 34a of the second step portion 34. Each of the spring vent marks 33b and 34b is an example of a vent mark according to the present invention.

As shown in FIG. 3, a length L of the first upper surface 33a of the first step portion 33 (size in the longitudinal direction of the stone ejector 30) is 2.5 mm according to the present embodiment. A width W of the first upper surface 33a of the first step portion 33 (size in the width direction of the stone ejector 30) is 2.5 mm. A diameter d of the spring vent mark 33b is 2 mm. Accordingly, the first upper surface 33a of the first step portion 33 is larger than the spring vent mark 33b. In other words, the spring vent mark 33b is sized to fit inside the first upper surface 33a of the first step portion 33.

The second upper surface 34a of the second step portion 34 has a size similar to the size of the first upper surface 33a of the first step portion 33. Accordingly, the second upper surface 34a of the second step portion 34 is larger than the spring vent mark 34b.

Figure 6:
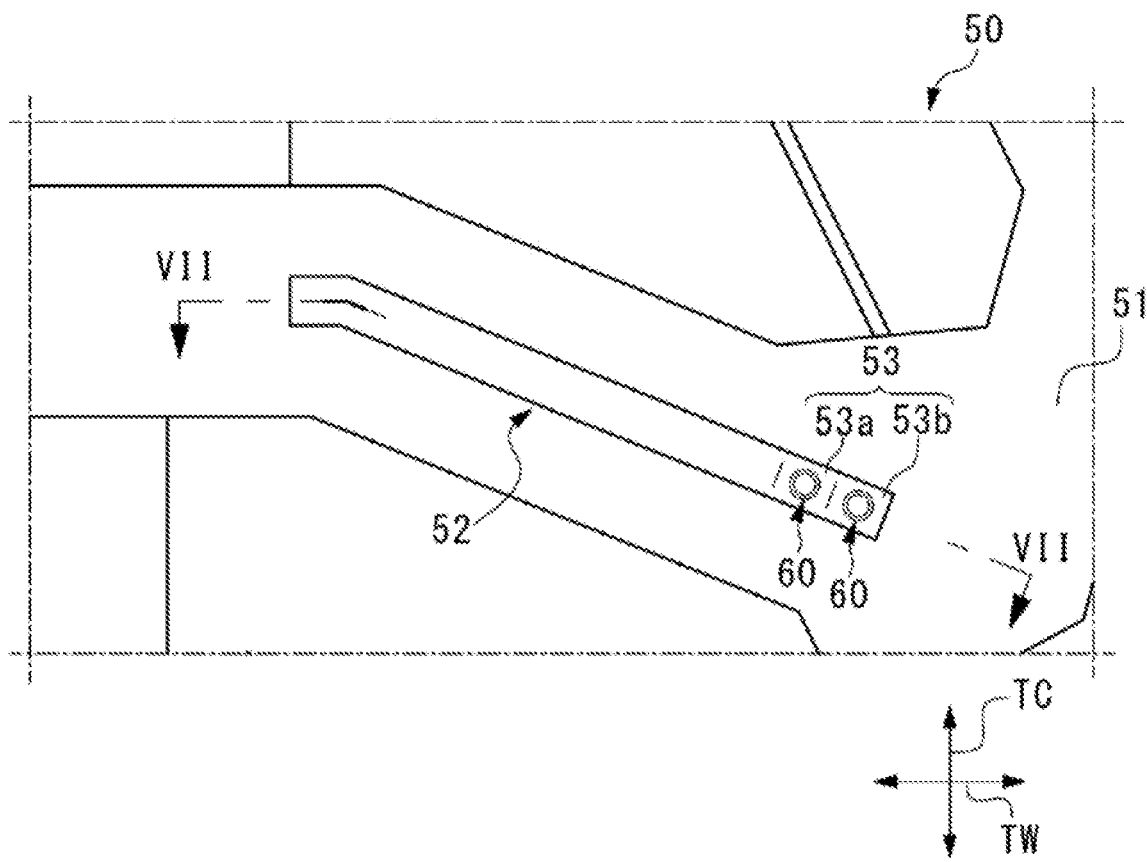
FIG. 6 is a view showing a main part of a molding surface of a tire vulcanization mold used for vulcanization molding of the pneumatic tire of the first embodiment.
Figure 7:
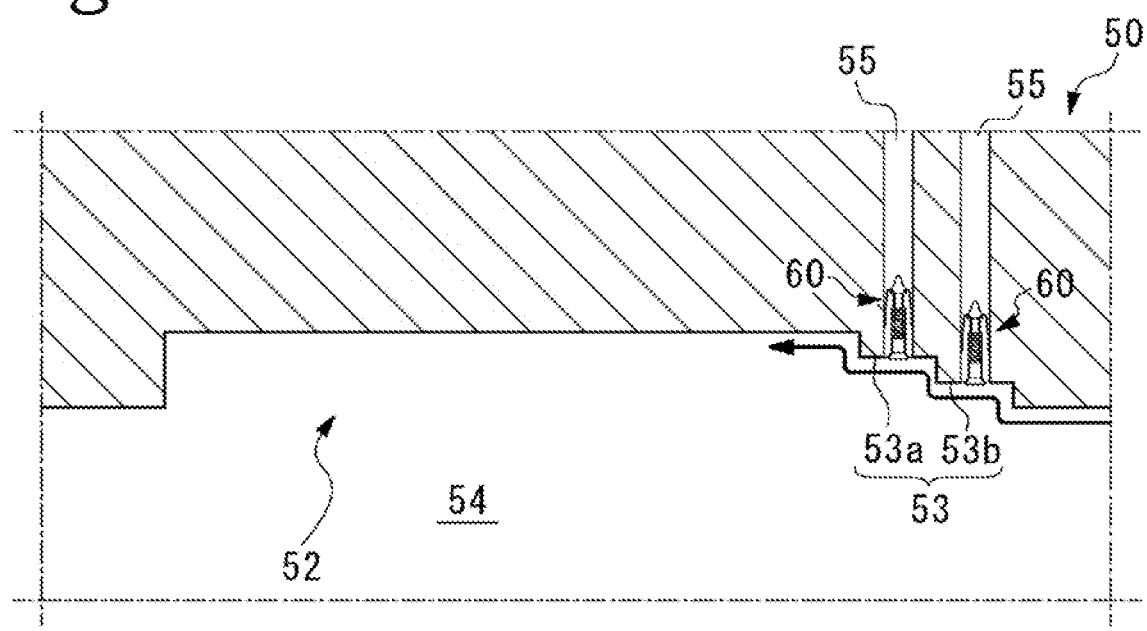
FIG. 7 is a cross-sectional view taken along line VII-VII.

FIG. 6 is a view showing a main part of a molding surface of a tire vulcanization mold 50 used for vulcanization molding of the pneumatic tire 1 of the present embodiment. More specifically, FIG. 6 is a view showing a recess 52 (described below) for molding the stone ejector 30, and surroundings in the molding surface of the tire vulcanization mold 50. FIG. 7 is a cross-sectional view taken along line VII-VII in FIG. 6. The stone ejector 30 of the present embodiment is molded by a flow of rubber into the recess 52.

Referring to FIG. 6, the tire vulcanization mold 50 of the present embodiment includes a protrusion 51 for molding the longitudinal groove 10 (shown in FIG. 3) and the lateral groove 20 (shown in FIG. 3). A recess 52 for molding the stone ejector 30 is formed in the protrusion 51. The recess 52 is recessed from a surface of the protrusion 51 to the side opposite to a cavity 54 (shown in FIG. 7). The protrusion 51 is an example of a groove forming portion according to the present invention.

The recess 52 has a shape corresponding to a shape of the stone ejector 30. The recess 52 is an example of the protrusion forming portion according to the present invention.

Referring to FIG. 7, the recess 52 includes a lowered portion 53 where a depth of the recess 52 increases from the outside to the inside in the longitudinal direction of the recess 52 in correspondence with a shape of the raised portion 32 (shown in FIG. 4) of the stone ejector 30. The lowered portion 53 includes a first upper surface molding surface 53a corresponding to the first upper surface 33a (shown in FIG. 4) of the first step portion 33 of the raised portion 32 of the stone ejector 30, and a second upper surface molding surface 53b corresponding to the second upper surface 34a (shown in FIG. 4) of the second step portion 34 of the raised portion 32. The second upper surface molding surface 53b is provided at a position deeper than a groove bottom molding surface of the protrusion 51 by one step. The first upper surface molding surface 53a is provided at a position deeper than the second upper surface molding surface 53b by one step.

The tire vulcanization mold 50 of the present embodiment includes a vent hole 55 extending in a direction perpendicular to the first upper surface molding surface 53a from this surface, and penetrating the tire vulcanization mold 50 to the outside. The spring vent 60 is fitted into an end portion of the vent hole 55 on the cavity 54 side. The spring vent 60 is an example of a vent according to the present invention.

The tire vulcanization mold 50 of the present embodiment includes the vent hole 55 extending in a direction perpendicular to the second upper surface molding surface 53b from this surface, and penetrating the tire vulcanization mold 50 to the outside. The spring vent 60 is fitted into an end portion of the vent hole 55 on the cavity 54 side.

Figure 8:
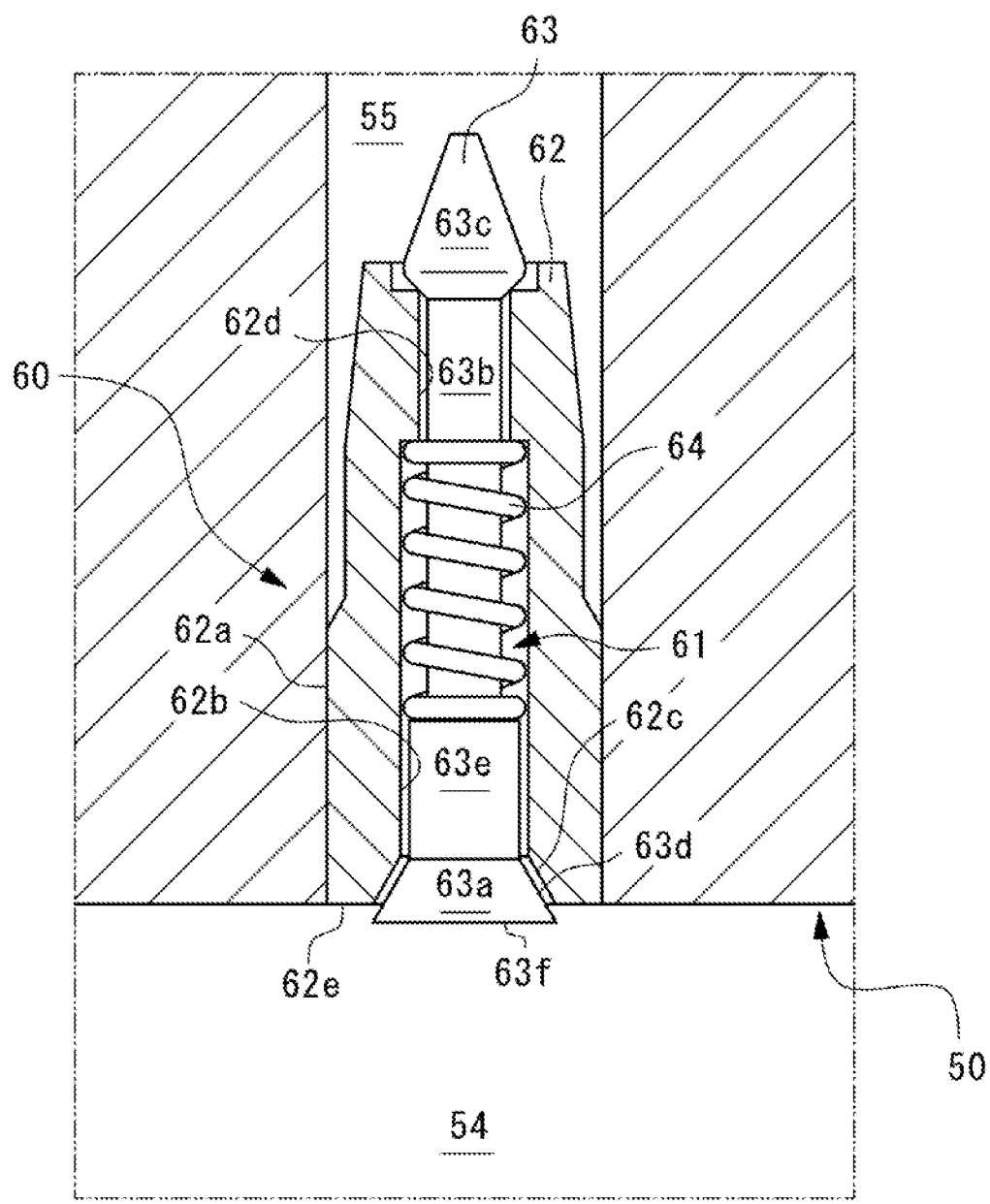
FIG. 8 is a longitudinal cross-sectional view of a spring vent.

FIG. 8 is a vertical cross-sectional view of the vent hole 55 and the spring vent 60 fitted into the vent hole 55.

As shown in FIG. 8, the spring vent 60 has a housing 62 having a cylindrical shape and including an exhaust passage 61 defined inside, a stem 63 inserted in the housing 62, and a coil spring 64 urging the stem 63 toward the cavity 54.

An outer circumferential portion 62a of the housing 62 is fitted into and held in the vent hole 55. The housing 62 has an inner circumferential portion 62b Penetrating in an axial direction of the housing 62. The exhaust passage 61 is Formed by the inner circumferential portion 62b. A tapered surface 62c is formed In an opening located at a lower end of the inner circumferential portion 62b. The Tapered surface 62c has a diameter elongated downward in a conical shape. A small Diameter portion 62d having a small diameter is formed in an upper portion of the inner circumferential portion 62b.

The stem 63 includes a valve body 63a located at a lower end, a shaft 63b extending upward from the lower end, and a stopper 63c located at an upper end. The valve body 63a has a truncated cone shape having a diameter elongated downward. A side surface portion 63d extends in parallel with the tapered surface 62c of the housing 62.

A large diameter portion 63e having a larger outer diameter than that of a portion located above is formed below the shaft 63b. A coil spring 64 is elastically provided around the shaft 63b between the large diameter portion 63e and the small diameter portion 62d of the inner circumferential portion 62b. The stopper 63c is positioned above the small diameter portion 62d. An outer diameter of the stopper 63c is larger than an inner diameter of the small diameter portion 62d. Downward movement of the stem 63 is regulated at the stopper 63c by the small diameter portion 62d to prevent separation of the stem 63 toward the cavity 54.

With an upward push of the stem 63 by a flow of rubber of a green tire to be vulcanized while resisting an urging force of the coil spring 64, the side surface portion 63d of the valve body 63a and the tapered surface 62c of the housing 62 come into surface contact with each other. Accordingly, a seal portion for closing the exhaust passage 61 is formed between these surfaces.

In a state where the valve body 63a is in contact with the tapered surface 62c, the stem top surface 63f at the lower end of the stem 63 is flush with the housing top surface 62e at the lower end of the housing 62. Accordingly, a seal portion is formed between the valve body 63a and the tapered surface 62c throughout the range of the tapered surface 62c in the up-down direction.

The pneumatic tire 1 of the present embodiment is obtained by vulcanization molding of a green tire (not shown) using the tire vulcanization mold 50. The spring vent marks 33b and 34b (shown in FIG. 4) are formed by vulcanization molding of unvulcanized rubber which has flowed into a space below the spring vent 60 in the vent hole 55. When the spring vent 60 is provided as in the present embodiment, unvulcanized rubber does not flow into the exhaust passage 61 of the spring vent 60 in the state where the stem 63 of the spring vent 60 does not close the exhaust passage 61 of the housing 62. In this case, generation of vent spews decrease, wherefore each of the spring vent marks 33b and 34b has a circular stripe shape similar to an external shape of the vent hole 55.

According to this configuration, the raised portion 32 of the stone ejector 30 is shaped such that the height of the raised portion 32 from the groove bottom surface 21 increases from the outside to the inside in the longitudinal direction of the stone ejector 30. Accordingly, the depth of the recess 52 of the tire vulcanization mold 50 corresponding to the stone ejector 30 increases from the outside to the inside in the longitudinal direction of the recess 52 in the lowered portion 53 corresponding to the raised portion 32 of the stone ejector 30. In this case, rubber is guided along the lowered portion 53 of the recess 52 corresponding to the raised portion 32 of the stone ejector 30 during vulcanization molding. Accordingly, the rubber easily flows to a deepest portion of the recess 52 while reducing a defective flow of rubber. Reduction of bareness is thus achievable.

In addition, the spring vent marks 33b and 34b are formed on the raised portion 32 of the stone ejector 30 as marks of the spring vents 60 of the tire vulcanizing mold 50. In this case, air is discharged to the outside of the tire vulcanization mold 50 through the vents in the lowered portion 53 of the recess 52 for the spring vents 60 corresponding to the raised portion 32 during vulcanization molding. Accordingly, bareness in the raised portion 32 of the stone ejector 30 can be effectively reduced.

According to this configuration, the spring vent marks 33b and 34b are formed as vent marks on the raised portion 32 of the pneumatic tire. The spring vent marks 33b and 34b are less noticeable than vent spews. In this case, the vent mark becomes less noticeable than in a case where the vent mark is a vent spew. Accordingly, deterioration of external appearance quality of the pneumatic tire is avoidable.

According to this configuration, the raised portion 32 has a stepped shape in a side view. The first upper surface 33a of the first step portion 33 and the second upper surface 34a of the second step portion 34 of the raised portion 32 are larger than the spring vent marks 33b and 34b, respectively. In this case, the spring vent marks 33b and 34b are fit inside the first upper surface 33a of the first step portion 33 and the second upper surface 34a of the second step portion 34, respectively, wherefore deterioration of appearance quality of the pneumatic tire can be reduced.

According to this configuration, the height of the raised portion 32 from the groove bottom surface 21 increases stepwise from the outside to the inside in the longitudinal direction of the main body 31. Accordingly, the lowered portion 53 of the recess 52 of the tire vulcanization mold 50 corresponding to the raised portion 32 during vulcanization molding becomes deeper stepwise from the outside to the inside in the longitudinal direction of the recess 52. In this case, rubber easily flows to the deepest portion of the recess 52 along the lowered portion 53 of the recess 52, wherefore bareness in the raised portion 32 of the stone ejector 30 can be reduced.

According to this configuration, the raised portion 32 has the plurality of spring vent marks 33b and 34b, while the two spring vents 60 are formed in the lowered portion 53 of the recess 52 of the tire vulcanization mold 50 corresponding to the raised portion 32. In this case, air can be discharged from one of the two spring vents 60 when the other of the two spring vents 60 is clogged with rubber. Accordingly, reduction of bareness is achievable even in this state.

Second Embodiment

Figure 9:
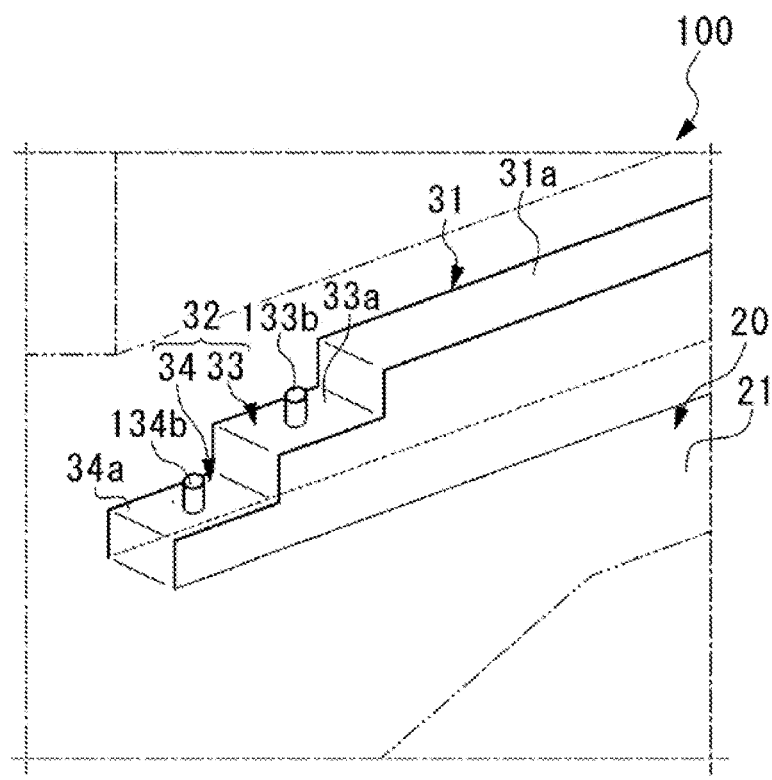
FIG. 9 is a perspective view similar to FIG. 4, showing a raised portion of a stone ejector and surroundings according to a second embodiment.

FIG. 9 is a perspective view showing a raised portion of a stone ejector and surroundings according to a second embodiment. A pneumatic tire 100 of the second embodiment has components similar to the corresponding components of the pneumatic tire 1 of the first embodiment except for shapes of vent marks formed on the raised portion of the stone ejector. Similar components are given identical reference numbers, and the same description of these components is not repeated.

As shown in FIG. 9, according to the present embodiment, vent spews 133b and 134b are formed on the raised portion 32 of the stone ejector 30. The vent spews 133b and 134b are marks of vent pieces 160 (shown in FIG. 10) of a tire vulcanization mold 150. The vent spew 133b is formed on the first upper surface 33a of the first step portion 33, while the vent spew 134b is formed on the second upper surface 34a of the second step portion 34. The vent spew 133b has a shape of whiskers extending from the first upper surface 33a of the first step portion 33 to the outside in the tire radial direction TR. Similarly, the vent spew 134b has a shape of whiskers extending from the second upper surface 34a of the second step portion 34 to the outside in the tire radial direction TR. Each of the vent spews 133b and 134b is an example of the vent mark of the present invention.

Figure 10:
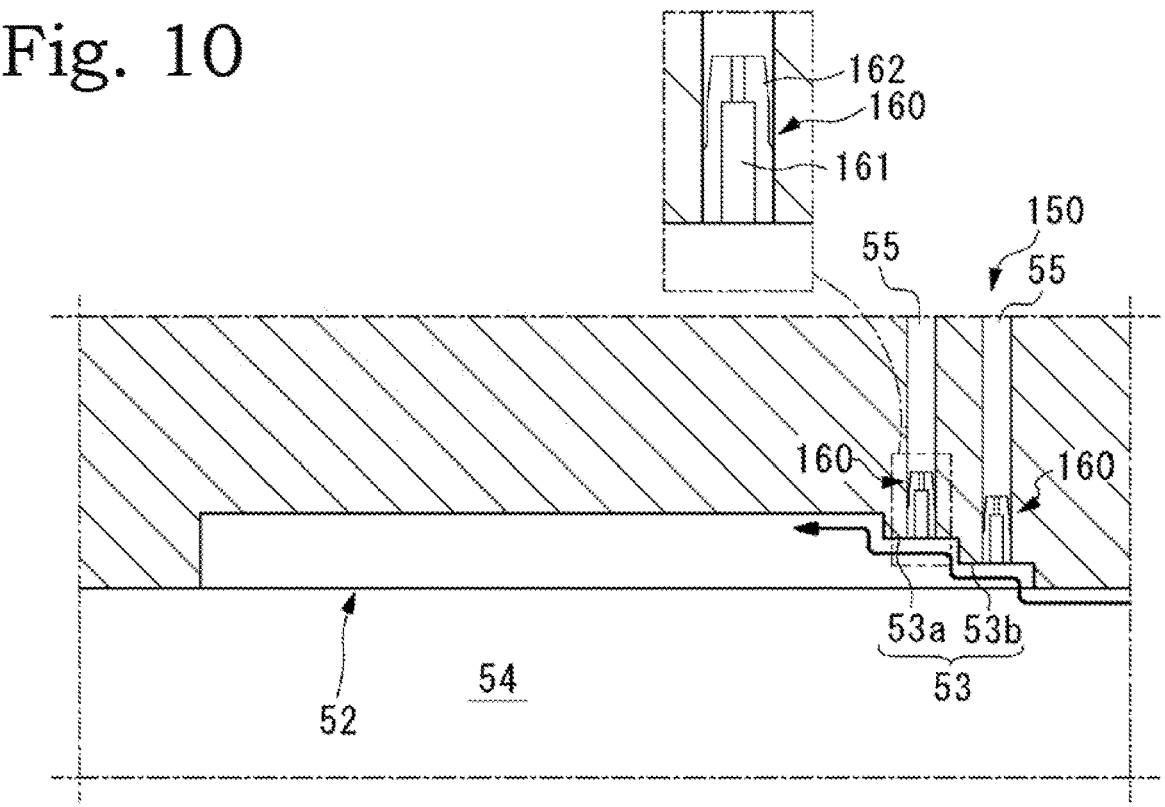
FIG. 10 is a cross-sectional view similar to FIG. 7, showing a tire vulcanization mold used for vulcanization molding of a pneumatic tire according to the second embodiment.

FIG. 10 is a cross-sectional view similar to FIG. 7, showing a main part of the tire vulcanization mold 150 used for manufacturing the pneumatic tire 100 according to the second embodiment. The tire vulcanization mold 150 of the second embodiment has a configuration similar to the configuration of the tire vulcanization mold 50 of the first embodiment except for vents. Similar components are given identical reference numbers, and the same description of these components is not repeated.

The vent piece 160 is fitted into each of the vent holes 55 of the present embodiment. The vent piece 160 is an example of a vent plug according to the present invention. The vent piece 160 includes a housing 162 which has a cylindrical shape and has an exhaust passage 161 defined inside the housing 162.

The pneumatic tire 100 of the present embodiment is produced by vulcanization molding of a green tire (not shown) using the tire vulcanization mold 150 of the present embodiment. The vent spews 133b and 134b are formed on the raised portion 32 of the pneumatic tire 100 by a flow of unvulcanized rubber into the exhaust passage 161 during vulcanization molding.

Effects similar to those of the first embodiment are produced in the second embodiment.

Third Embodiment

Figure 11:
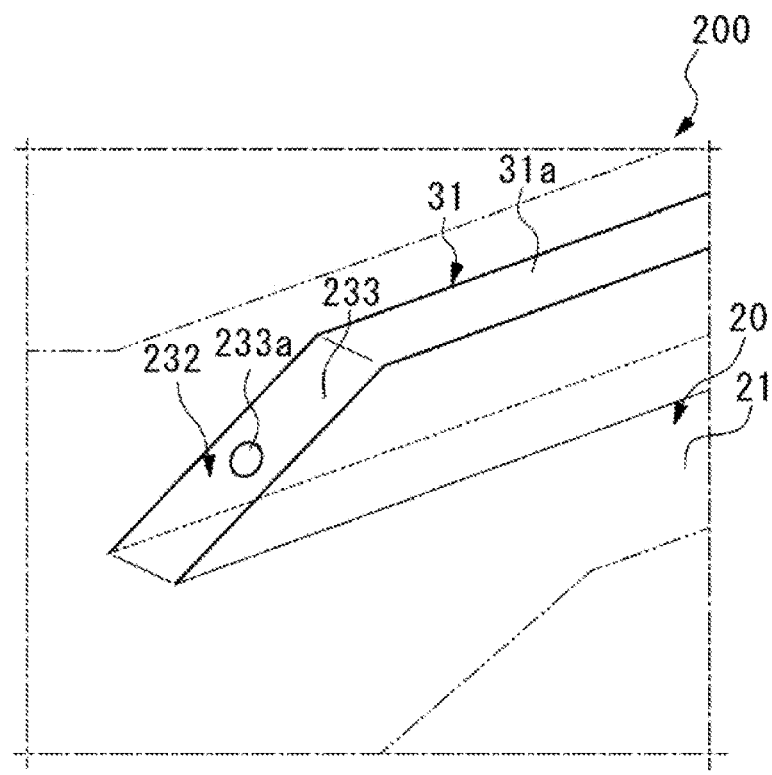
FIG. 11 is a perspective view similar to FIG. 4, showing a raised portion of a stone ejector and surroundings according to a third embodiment.
Figure 12:
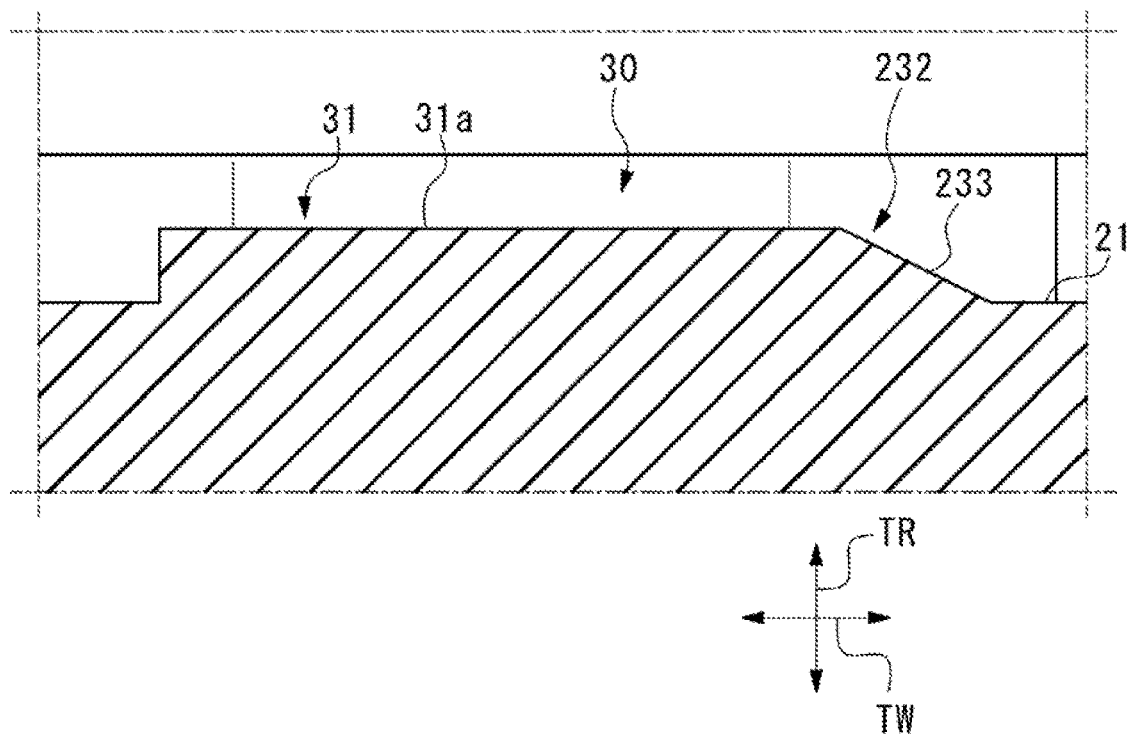
FIG. 12 is a cross-sectional view similar to FIG. 5, showing the stone ejector according to the third embodiment.

FIG. 11 is a perspective view showing a raised portion of a stone ejector and surroundings according to a third embodiment. FIG. 12 is a cross-sectional view similar to FIG. 5, showing the stone ejector according to the third embodiment. A pneumatic tire 200 of the third embodiment has components similar to the corresponding components of the pneumatic tire 1 of the first embodiment except for a shape of the raised portion of the stone ejector. Similar components are given identical reference numbers.

Referring to FIGS. 11 and 12, a raised portion 232 of the present embodiment is inclined such that a height of the raised portion 232 from the groove bottom surface 21 increases from the outside to the inside in the longitudinal direction of the stone ejector 30 in a side view. Specifically, the raised portion 232 of the present embodiment has an upper surface 233 having a rectangular shape and extending from the inside to the outside in the longitudinal direction of the stone ejector 30 and from the outside to the inside in the tire radial direction TR. As shown in FIG. 11, a spring vent mark 233a is formed on the upper surface 233 of the raised portion 232 of the present embodiment. The spring vent mark 233a is an example of the vent mark according to the present invention.

Figure 13:
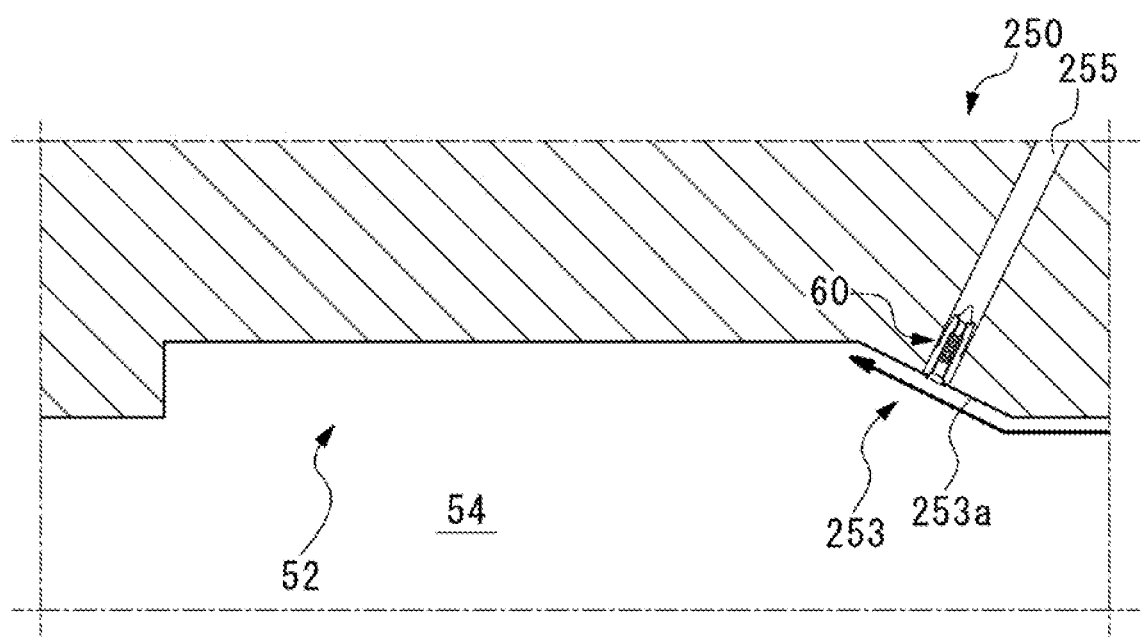
FIG. 13 is a cross-sectional view similar to FIG. 7, showing a tire vulcanization mold used for vulcanization molding of a pneumatic tire according to the third embodiment.

FIG. 13 is a cross-sectional view similar to FIG. 7, showing a tire vulcanization mold 250 used for manufacturing the pneumatic tire 200 according to the present embodiment. The tire vulcanization mold 250 of the third embodiment has a configuration similar to the configuration of the tire vulcanization mold 50 of the first embodiment except for a lowered portion. Similar components are given identical reference numbers, and the same description of these components is not repeated.

Referring to FIG. 13, the lowered portion 253 of the present embodiment is inclined such that the depth of the recess 52 increases from the outside to the inside in the longitudinal direction of the recess 52. The lowered portion 253 of the tire vulcanization mold 250 of the present embodiment has a molding surface 253a corresponding to a shape of the upper surface 233 of the raised portion 232 of the stone ejector 30. The molding surface 253a of the lowered portion 253 extends from the inside to the outside in the longitudinal direction of the recess 52 in such a direction as to approach the cavity 54. The tire vulcanization mold 250 of the present embodiment includes a vent hole 255 extending in a direction perpendicular to the molding surface 253a of the lowered portion 253 from this surface, and penetrating the tire vulcanization mold 250 to the outside. The spring vent 60 is fitted into an end portion of the vent hole 255 on the cavity 54 side.

The pneumatic tire 200 of the present embodiment is produced by vulcanization molding of a green tire (not shown) using the tire vulcanization mold 250 of the present embodiment. The spring vent mark 233a is formed by vulcanization molding of unvulcanized rubber which has flowed into a space below the spring vent 60 during vulcanization molding.

Effects similar to those of the first embodiment are produced in the third embodiment.

Although the specific embodiments of the present invention have been described, the present invention is not limited to the above embodiments. Various modifications may be made without departing from the scope of the present invention.

For example, the stone ejector 30 has been described in the first embodiment and the second embodiment as an example of the protrusion of the present invention. However, the protrusion is not limited to this example.

According to the first embodiment and the second embodiment, the raised portion has two step portions. However, the raised portion may have one step portion, or three or more step portions. The respective step portions may have different sizes.

According to the first embodiment and the second embodiment, one vent mark is formed on each of the step portions. However, a plurality of vent marks may be formed on one step portion. When the raised portion has a plurality of step portions, the step portions may include a step portion having no vent mark.

According to the first embodiment and the second embodiment, the vent plug like the spring vent or the vent piece is fitted into the vent hole as an example of the vent. However, the vent is not limited to these examples but may be a vent hole. In this case, the vent mark becomes a vent spew having an external shape corresponding to a shape of the vent hole.

What is claimed is:

1. A pneumatic tire comprising:
   a lateral groove that includes a groove bottom surface extending in a direction crossing a tire circumferential direction; and
   a protrusion provided on the groove bottom surface and extending in an extension direction of the groove bottom surface, wherein
   the protrusion includes:
   a main body; and
   a raised portion provided at least at one end portion on one side in a longitudinal direction of the main body, and shaped such that a height of the raised portion raised from the groove bottom surface increases from an outside to an inside in the longitudinal direction of the main body,
   the raised portion has at least one vent mark that is a mark of a vent of a tire vulcanization mold,
   the raised portion includes at least one step portion to have a stepped shape in a side view,
   an upper surface of the at least one step portion is larger than the at least one vent mark, and
   the upper surface of the at least one step portion is disposed below an upper surface of the main body.

2. The pneumatic tire according to claim 1, wherein
   the vent is a vent plug, and
   the at least one vent mark is a vent spew.

3. The pneumatic tire according to claim 1, wherein
   the vent is a spring vent, and
   the at least one vent mark is a spring vent mark.

4. The pneumatic tire according to claim 1, wherein
   the at least one step portion includes a plurality of step portions, and the raised portion includes the plurality of the step portions.

5. The pneumatic tire according to claim 4, wherein each of the plurality of step portions has the at least one vent mark.

6. The pneumatic tire according to claim 1, wherein
   the at least one vent mark includes a plurality of vent marks, and the raised portion has the plurality of the vent marks.

\* \* \* \* \*